US012718343B2

(12) United States Patent
Kim et al.

(10) Patent No.: US 12,718,343 B2
(45) Date of Patent: Aug. 25, 2026

(54) AIRCRAFT AND METHOD FOR INSPECTING EQUIPMENT IN COKING PLANTS TO DETECT SOURCES OF ERROR

(71) Applicants: thyssenkrupp Industrial Solutions AG, Essen (DE); thyssenkrupp AG, Essen (DE)

(72) Inventors: Ronald Kim, Essen (DE); Marcel Schulz, Bochum (DE); Uwe Conrads, Mettmann (DE); Philipp Esser, Cologne (DE); Sophie Ruoshan Wei, Munich (DE)

(73) Assignees: thyssenkrupp Industrial Solutions AG, Essen (DE); thyssenkrupp AG, Essen (DE)

( * ) Notice: Subject to any disclaimer, the term of this patent is extended or adjusted under 35 U.S.C. 154(b) by 367 days.

(21) Appl. No.: 18/273,256

(22) PCT Filed: Jan. 18, 2022

(86) PCT No.: PCT/EP2022/051025
§ 371 (c)(1),
(2) Date: Jul. 19, 2023

(87) PCT Pub. No.: WO2022/157152
PCT Pub. Date: Jul. 28, 2022

(65) Prior Publication Data

US 2024/0144459 A1 May 2, 2024

(30) Foreign Application Priority Data

Jan. 20, 2021 (DE) ..................... 10 2021 101 102.7

(51) Int. Cl.

| | |
|---|---|
| ***G06T 7/00*** | (2017.01) |
| ***B64U 101/30*** | (2023.01) |
| ***C10B 45/00*** | (2006.01) |

(52) U.S. Cl.
CPC ............ *G06T 7/0004* (2013.01); *C10B 45/00* (2013.01); *B64U 2101/30* (2023.01); *G06T 2207/20182* (2013.01)

(58) Field of Classification Search
CPC ....... G06T 7/0004; G06T 7/0002; G06T 7/00; G06T 2207/10024; G06T 2207/10048;
(Continued)

(56) References Cited

U.S. PATENT DOCUMENTS

2012/0262708 A1* 10/2012 Connolly ............... G01N 21/88
701/2
2014/0168420 A1* 6/2014 Naderhirn ........... G01M 5/0091
348/128

(Continued)

FOREIGN PATENT DOCUMENTS

CN 206606351 U 11/2017
CN 206634207 U 11/2017

(Continued)

OTHER PUBLICATIONS

English Translation of International Search Report issued in PCT/EP2022/051025, dated Jul. 25, 2022.

*Primary Examiner* — Shelby A Turner
(74) *Attorney, Agent, or Firm* — thyssenkrupp North America, LLC

(57) ABSTRACT

The present disclosure relates to an aircraft and to a method using this aircraft to inspect equipment in coking plants for detecting sources of error. The aircraft has at least one inspection device for inspecting surfaces of the equipment that are to be inspected, and an airspace, distanced from one of the surfaces to be inspected, and at least one transmitting and receiving device for data communication with at least other aircraft or at least one external analysis device for detecting the sources of error. The method comprises converting the detected phototechnical and optical data, in
(Continued)

particular 2D data, into a 3D thermal point cloud by means of a conversion unit of the analysis device.

5 Claims, 8 Drawing Sheets

(58) Field of Classification Search
CPC . G06T 2207/10028; G06T 2207/10032; G06T 2207/10084; G06T 2207/20182; G06T 2207/30252; B64C 39/024; G01B 11/14; G01B 11/24; C10B 45/00; G01M 5/0033; Y02P 90/02; B64U 2101/30; B64U 30/20; B64U 50/19; B64U 10/13; B64U 20/87
USPC .......... 73/583, 659, 602, 865.8; 340/426.16; 356/237.1, 51; 382/141; 700/108, 30, 700/266; 702/35, 34, 33, 183, 185, 184, 702/182, 1, 127, 188, 40, 189, 113
See application file for complete search history.

(56) References Cited

U.S. PATENT DOCUMENTS

2016/0214715 A1* 7/2016 Meffert .................. B64U 20/87
2016/0282872 A1* 9/2016 Ahmed .................. G05D 1/102
2017/0193297 A1* 7/2017 Michini ............... G05D 1/0038
2017/0318477 A1 11/2017 Priest
2018/0130361 A1* 5/2018 Loveland ............. G06V 20/176
2018/0284735 A1 10/2018 Cella et al.
2019/0256208 A1 8/2019 Noto
2020/0125099 A1 4/2020 Panthaky
2020/0279367 A1* 9/2020 White ...................... G06N 3/08
2020/0320293 A1* 10/2020 Yang ..................... G06F 18/214
2020/0363822 A1* 11/2020 Georgeson .......... G01M 5/0016
2020/0391882 A1 12/2020 Terry et al.

FOREIGN PATENT DOCUMENTS

CN 209700925 U * 11/2019 ............. B64C 25/64
CN 111505052 A 8/2020
DE 69723380 T2 7/2004
DE 20 2012 100 128 U1 2/2012
DE 102013101194 A1 8/2014
DE 102014009335 B3 * 10/2015 ............. G05D 1/102
DE 10 2016 206 982 A1 10/2017
EP 1473350 A1 11/2004
EP 2660558 A1 11/2013
EP 3738892 A1 * 11/2020 ............. B64U 50/19
JP 2002226861 A 8/2002
JP 2011126989 A 6/2011
JP 5368288 B2 12/2013
JP 5394908 B2 1/2014
JP 6544161 B2 7/2019
JP 6740827 B2 8/2020
JP 7242881 B2 3/2023
KR 10 2009 0032034 A 3/2009
KR 101664908 B1 10/2016
KR 20180007861 A * 1/2018 ............. C01B 32/00
KR 20190075473 A * 7/2019 ........... B64C 39/024
WO 2016/172260 A1 10/2016
WO 2017/074605 A1 5/2017
WO WO-2019144317 A1 * 8/2019 .............. F24S 40/90
WO 2020/123505 A1 6/2020

* cited by examiner

AIRCRAFT AND METHOD FOR INSPECTING EQUIPMENT IN COKING PLANTS TO DETECT SOURCES OF ERROR

CROSS REFERENCE TO RELATED APPLICATIONS

This application is a U.S. National Stage Entry of International Patent Application Serial Number PCT/EP2022/051025, filed Jan. 18, 2022, which claims priority to German Patent Application No. DE 10 2021 101 102.7, filed Jan. 20, 2021, the entire contents of all of which are incorporated herein by reference.

FIELD

The present disclosure generally relates to an aircraft for inspecting equipment in coking plants to detect sources of defects, and to a corresponding method using the aircraft.

BACKGROUND

It is known that coke oven batteries consist of up to 90 coke oven chambers coupled to one another in the longitudinal direction, each of these coke oven chambers being framed on both sides by a heating wall. As viewed in the transverse direction, this heating wall is composed of up to 44 individual hollow channels lined up in a row, which are also referred to as heating flues. In these heating flues of the heating walls, heat is generated by combustion of heating gases to heat the adjacent coke oven chambers filled with coal. This means that the heating of a single coke oven battery from individual combustion processes is ensured in up to approximately 3800 heating flues. The aforementioned alternating arrangement of oven chamber and heating wall gives rise to coke oven batteries with a respective length of up to 140 m and depths of up to 25 m and heights of up to 20 m.

In the commissioning of these structures, it is the responsibility of the corresponding specialist personnel to set the heating of the heating flues of the battery individually in such a way that the coal beds in the oven chambers in between heat up uniformly, thus ensuring that a high-quality coke end product is produced. Based on the system-inherent cone of the oven chambers, each heating flue, as viewed in the transverse direction of the coke oven battery, requires individual setting of the heating, wherein at the same time the heating must be set in such a way that these stringent emission-related requirements are satisfied. This means that, as is known, temperature peaks must be avoided and thermal nitrogen oxide formation must be minimized.

Based on the fact that, as viewed in the transverse direction of the coke oven battery, all the heating flues of one heating wall are fluidically connected to one another, the choice of a setting at one heating flue often leads to unwanted and unforeseeable changes at the other, possibly even already adjusted, heating flues. The high number of combustion processes to be set consequently leads to iterative setting work on the coke oven battery, taking periods of several months. In addition, properties of the coal, which is stored uncovered, that are relevant in terms of process engineering, such as the water content and volatile constituents, change almost continuously during oven operation owing to weather conditions, leading to the need for daily adaptations to the setting of the heating. From the outside, that is to say outside the coke oven battery, the resulting temperature conditions within the heating flues can only be determined by time-consuming manual measurements by the personnel through openings in the horizontal coke oven roof of the coke oven battery by means of pyrometers. As a result, only a small number of heating flues can be evaluated per working shift per day, and therefore it can take several weeks for all the heating flues to be evaluated and consequently for a first overall thermal image of the coke oven battery to be available. However, on account of the operational adjustments that have become necessary again in the meantime, as mentioned above, this overall thermal image may then already be regarded as out-of-date and therefore invalid. As a result, the overall evaluation of the coke oven battery leads to temporary misjudgments, is lengthy and expensive. Nonoptimum adjustment of the heating in the transverse direction of the coke oven and in the longitudinal direction of the coke oven disadvantageously leads to unwanted nonuniform distribution of the coke quality over the base area of the coke oven battery. In addition, the nonuniform thermal setting of the heating of the coke oven battery, which is not matched to the coke oven battery cone and is consequently incorrect, is associated with high emission loads. The temperature-dependent nitrogen oxide emission load, which is always coupled to stringent limit values by local environmental authorities, is of great significance here.

It is furthermore basically known that the inspection, in particular the monitoring of the state of the lateral structures of the coke oven battery, during and also after the commissioning thereof, is also difficult, in particular time-consuming and expensive. As a primary consideration, for example, there is a need to monitor the settings of the springs of the transverse anchorage and of the lateral coke oven and leveler doors in order to ensure correct adjustment of the contact pressure elements, this being a prerequisite for optimum sealing of the lateral coke oven cover elements. If the sealing is inadequate, unwanted emissions into the atmosphere through the gaps between the door sealing strips and the contact pressure surfaces disadvantageously occur as a result of the excess pressure in the coke oven chamber. The virtually invisible benzo[a]pyrene emissions through these barely perceptible gaps in the masonry of the battery or at the contact pressure surfaces of the anchoring system are therefore of increasing significance in daily plant operation since they represent a particularly dangerous source of harmful effects on the health of the workforce working in the vicinity of the coke oven battery.

Owing to the large overall height of the coke oven battery, specialist personnel are only able to carry out limited-time assessments, in particular visual assessments, of spatially selected regions of the lateral front during the commissioning of the coke oven battery, using elevating-platform trucks on the two operating platforms of the coke oven battery, and therefore the upper sections of the coke oven battery can usually only be inspected from a great distance (from a distance of more than 10 m) and thus only superficially. Incorrect settings of the anchoring springs and of the door springs as well as possible sources of emissions caused by cracks can only be detected with difficulty during this process. This means that a large number of relatively small sources of emissions, especially in the upper region of the coke oven battery, are not discovered, with the result that the emission load of the coke oven battery increases to such an extent that it is usually greater at the official measurement locations of the local environmental authorities than in the on-site assessment.

Cracks, damage, leaks, etc. in the coke oven battery and the resulting health-endangering emissions also lead to ineffective and inefficient use of the coke oven battery. In particular, the ingress of fresh air which can occur, for example, as a result of cracks in the masonry or as a result of deformations of the sight hole in the roof and which occurs primarily during the filling of the coke oven chambers, during which, in particular, the excess pressure, which is usually present, does not occur, can lead to a negative uneven distribution of the temperature over the coke oven battery base area during the use of the coke oven battery. This is reflected, in turn, in a decline in coke quality and, in turn, in increasing emissions. This makes the operation of the coke oven battery increasingly uneconomical and more expensive and energy-intensive.

However, it is not only the detection of problem zones on the large surfaces and at high levels of the coke oven battery in respect of the individual components or objects, such as oven doors, leveler doors, wall protection plates, buckstays, chamber and door frames, crossties and longitudinal ties, riser pipes, etc., that is time-consuming and error-prone according to the current state of knowledge. Unwanted deformations of components and construction devices of the coke oven battery, which can occur on account of the high ambient temperatures in the region of the coke oven battery, such as, for example, on the various gas lines, are frequently also not detected. This can disadvantageously reduce the overall stability of the structure or of the coke oven battery.

As already mentioned above, the coke oven battery is exposed to high temperatures, leading to substantially continuous deformation of the coke oven battery, in particular its components and attachments. This deformation is also caused, for example, by an increase in the refractory lining of the coke oven battery as a result of temperature-induced expansion processes of the material. In this case, deformations of several centimeters per year can occur, for example, in the region of the rails, the filling holes formed in the coke oven roof, the crossties and longitudinal ties, and the coke oven doors on the coke and machine side. Owing to this deformation, a large number of consequential damages occur, such as: the filling of the filling holes by the filling machines can no longer be ensured in a reliable process, in particular because their filling telescopes, through which the coal flows down into the coke oven, no longer fit exactly into the filling hole frames of the coke oven and consequently form undesirable gaps greater than 2 mm. As a result, leaktightness during the filling process is also no longer assured, giving rise in turn to harmful emissions for the environment and the specialist personnel. The functionality of the door openings is also adversely affected. When the refractory masonry is deformed, the doors and door frames are also deformed, and therefore their leaktightness is likewise no longer assured. Likewise, deformation disadvantageously leads to an increased expenditure in the setting/adjustment of the springs which hold together the refractory lining (heating wall) of the coke oven battery.

Since a large number of maintenance and monitoring operations can only be carried out by random sampling owing to the inaccessibility of certain sections of the coke oven battery, regions with relevant negative thermal or expansion-related changes are usually not recognized at all or only at a very late stage by the operator of the coke oven battery. The subsequent repair and maintenance work, which is usually lengthy, hinders the normal operation of the coke oven battery or of the entire coking plant in such a way that a reduced plant capacity and associated reduced coke production also entail a loss of profit.

Thus a need exists to at least partially eliminate the disadvantages described above in the detection of sources of defects in a coke oven battery, in particular a coking plant. The disclosure provides an aircraft and a method for inspecting equipment in coking plants in order to detect sources of defects, which detect sources of defects in a reliable process in a simple and low-cost manner and predict possible necessary maintenance.

BRIEF DESCRIPTION OF THE FIGURES

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION

Figure 1:
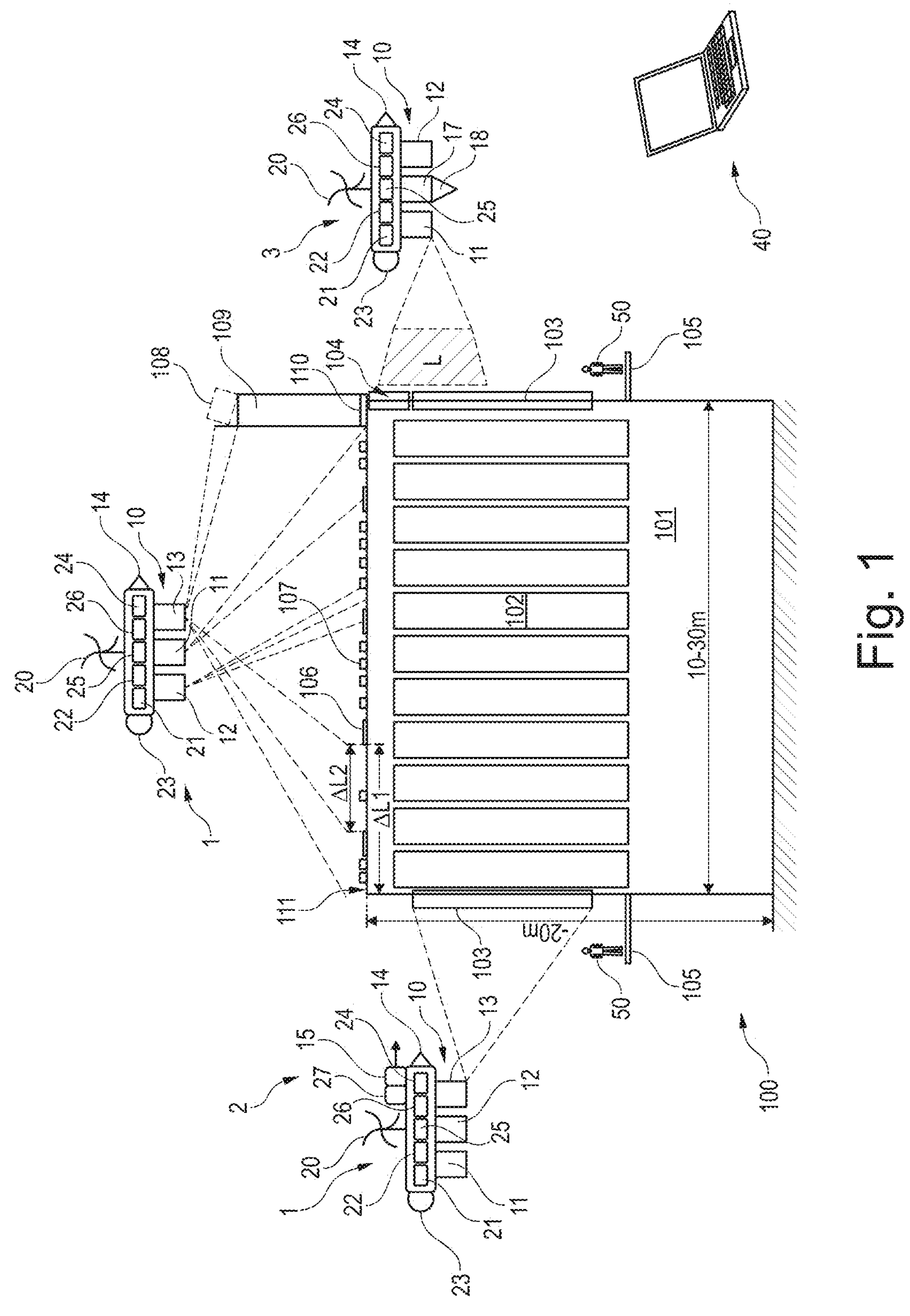
FIG. 1 shows a side view of a coke oven of a coking plant as well as an aircraft according to the disclosure during the inspection of equipment of the coke oven.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

According to a first aspect of the disclosure, an aircraft for inspecting equipment in coking plants in order to detect sources of defects is claimed. The aircraft has at least one propeller (wherein two or more propellers can also be arranged) with at least one electric motor for enabling it to fly, at least one rechargeable battery for providing electrical energy, a flight controller for controlling the electric motor, sensors at least for determining the flight altitude or the angular velocity or obstacles on the flight path, and a satellite-controlled position detection module, such as a GPS or GPS-like module for determining the position. According to the disclosure, the aircraft additionally has at least one inspection apparatus for inspecting surfaces of the equipment which are to be inspected and for inspecting an air space spaced apart from the surfaces which are to be inspected, and at least one transmitting and receiving device for data communication with at least other aircraft or with at least one external analysis device for detecting the sources of defects. Advantageously, the aircraft according to the disclosure can be used to generate a 3-dimensional overall image of the plant or coking plant for determining thermal, deformation and emission-related changes in the plant. By means of continuous or sequential use of the aircraft, it is advantageously possible to produce a comprehensive image of the plant in respect of any sources of defects at short time intervals, advantageously several times a day, and, with the assistance of the analysis device, to formulate suitable suggestions for action to correct the defects and advantageously also to avoid future defects. Thanks to the aircraft according to the disclosure, a brief evaluation, for example, of the heating setting and the external emission load of the coke oven battery of the coking plant can advantageously be carried out reliably during the commissioning of the coking plant or else during a later inspection. It is thus advantageously possible to quickly identify heating flues in which temperature peaks lead to undesirably high nitrogen oxide formation and to readjust them as regards the heating, thereby in turn ensuring an adequate coke quality. In this context, readjustment is understood to mean, for example, readjustment of the springs of the anchors or deformed buckstays which exceed limit values calculated according to (coke-oven-)specific algorithms. The readjustment work itself can be carried out as part of regular maintenance work. This advantageously leads to minimized emissions as well as reduced use of specialist personnel and time to be spent as well as reduced maintenance costs for the plant operator. At the same time, the ongoing operation of the plant, such as the coke oven battery, is hardly disrupted and the plant capacity and the quality of the plant product produced (here, for example, the coke quality) remain at a high nominal level.

A coke plant is understood to mean equipment for the pyrolysis of coal or raw biomaterials to form coke, such as horizontal chamber plants operating in bulk or stamping mode with a downstream chemical secondary recovery device, horizontal-chamber coke oven batteries with downstream thermal flue gas heat recovery, and vertical-chamber plants, which each have coal pretreatment and coke after-treatment devices. The directional terms are determined by the direction in which the coke product is pushed out of the oven chambers. In a further embodiment of a coking plant, coal is converted to coke in a rotary kiln.

The aircraft according to the disclosure is advantageously an aircraft capable of moving in space, such as a drone. The aircraft can advantageously (fully) automatically fly to or from predefined regions of coke plants, such as, for example, a coke oven battery, in order to carry out measurements and to record images of different regions of the coking plant, such as, for example, horizontal outer surfaces or laterally adjoining vertical surfaces of a coke oven battery. It should be mentioned in the context of the disclosure that the aircraft is not only useful for use in coking plants, but can also be employed in other (chemical) plants. Accordingly, the general term "plant" is used below. The aircraft according to the disclosure advantageously also makes it possible to inspect impassable containers and pipelines of the plant, in particular of the coking plant. As a particular advantage, the aircraft according to the disclosure also serves for the inspection of component devices of a plant, in particular a coking plant, such as a coal tower, a coke ramp, a quenching tower, an effluent plant, a by-recovery plant, a cooling tower, a tar separator, a Claus plant, etc. Furthermore, it is possible with the aid of the aircraft to detect the occupation of the coal or coke storage site and thus to obtain an estimate of the current raw material and product storage stocks of the coke plant, from which it is possible to derive positive effects for purchasing logistics together with economic advantages. Thanks to the aircraft according to the disclosure, rapid flight through the plant at any desired distance from an outer surface and repeatable measurement of the plant or determination of plant-specific data are possible in a low-cost manner.

Advantageously, an electrical energy supply, such as a rechargeable battery/a battery, is used to propel the aircraft, allowing not only propulsion of the aircraft (feeding the electric motor with electrical energy) but also the supply of energy to the inspection apparatus. However, it would also be conceivable for the aircraft to have an internal combustion engine and/or a compressed air drive in addition to the electrical energy supply, in particular in order to enable movement/flight of the aircraft.

It is furthermore conceivable for the aircraft to be controlled by an operator who can approach sections/regions relevant to measurements, in particular objects/structures of the plant, in order to carry out targeted measurements. Accordingly, it is also conceivable for the aircraft to carry out measurements and image generation in a substantially (fully) automatic way in accordance with predetermined, in particular time interval-controlled, maintenance flights, it also being possible for an operator to intervene at any time in these flights and to take over the operation of the aircraft. Accordingly, the aircraft can be switched between the modes in a fully automatic, semi-automatic or manual way at any time. In the context of the disclosure, the fully automatic mode is understood to mean time-controlled flying of the aircraft with predetermined measurement intervals and image recordings, in which mode no operator intervenes and also no operator need be present during the activity of the aircraft. In the context of the disclosure, the semi-automatic mode is understood to mean automatic flight to and from predefined regions (objects/structures) of the plant, wherein an operator can modify, interrupt or supplement measurements or image generation at any time. Or wherein the operator flies to relevant regions of the plant of relevance to the operator and the aircraft automatically decides, for example on the basis of previously recorded values, what measurements must be made in addition at this point of the plant (since there may not yet be sufficient data for this) or what image data must be generated from this section of the plant in order to be able to completely map the plant. In the context of the disclosure, the manual mode is understood to mean an operator mode in which the operator decides independently, without the aircraft exerting any influence, which section, in particular which objects/structures of the plant that are to be examined or observed, they want to approach with the aircraft and what measurements or what image generation they want to carry out there. It is conceivable for the inspection apparatus to be of one-piece or multi-piece construction. It is advantageous if the inspection apparatus has at least one measuring device. It is also conceivable for the inspection apparatus to have a multiplicity of measuring devices, it being possible for these measuring devices to be arranged in different positions/sections or regions of the aircraft. That is to say that the inspection apparatus or the at least one measuring device of the inspection apparatus can be arranged on the upper side, the underside or else laterally on the aircraft. The positioning of the at least one measuring device, in particular the plurality of measuring devices, is determined by their functionality and the required alignment associated therewith. It is advantageous if the inspection apparatus and, in particular, the at least one measuring device thereof is exchangeable. This advantageously makes possible simple replacement of the measuring devices as well as a tailored combination of the measuring devices, according to requirements. It is furthermore possible for the aircraft to have a storage unit at least for short-term storage of the data acquired by the inspection apparatus. These acquired data are then advantageously transferred or sent to an analysis device via Bluetooth, radio signal, WLAN or some other wireless form of transmission. A transmitting and receiving device, which is likewise a component of the aircraft, is advantageously used for this purpose. In addition or as an alternative, it is conceivable for the acquired data also to be forwarded to other aircraft. This is expedient, in particular, when several aircraft, in particular two or more aircraft, are used on one plant. It is conceivable here for each of the aircraft to have the same inspection apparatus with the same measuring devices (type and number) or for each of the aircraft to have a different inspection apparatus with a different number of measuring devices or different types of measuring devices. By exchanging data between the aircraft, it is possible to define regions or sections of the plant in which additional measurements or supplementary measurements are required. One aircraft can also use a measurement result to instruct another aircraft to carry out a comparison measurement in order to generate an accurate (verified) measured value.

It is also possible for the aircraft to record measurement data from non-mobile measuring apparatuses in the region of the coke oven battery or the plant, in particular the coking plant, and to feed them to an evaluation unit. In the case of a non-mobile measuring apparatus of this kind, in particular a stationary measuring apparatus, there is a pressure measuring sensor located, for example, in the oven roof of a heat recovery coke oven battery. Temperatures, gas compositions and volume flows can also be detected or measured by at least one permanently or temporarily installed measuring apparatus in the coking plant and sent to the aircraft or a multiplicity of aircraft. In another embodiment, the fill level of a liquid container or basin can be measured and sent to the aircraft.

According to one embodiment, the inspection apparatus has a temperature measuring device, which contactlessly, in particular at least optically or thermographically, determines a temperature field on a surface to be inspected. In the context of the disclosure, this temperature measuring device can also be understood as a thermographic device. The temperature measuring device can be, for example, an infrared temperature measuring device, in particular a laser infrared thermometer or a thermal camera. It is thereby advantageously possible to determine temperature data contactlessly and in a reliable process, even at high temperatures, without the aircraft having to be moved too close to the measurement point to be measured.

According to one embodiment, the inspection apparatus has a gas concentration measuring device, which detects gas concentrations in an air space spaced apart from the surfaces which are to be inspected. The gas concentration measuring device, which can also be referred to as an emission measuring device, is advantageously a chemically reactive device. Accordingly, it is possible to measure a gas concentration, such as, for example, concentrations of nitrogen oxides, sulfur oxides, dust particles, higher hydrocarbons, carbon monoxides, benzo[a]pyrenes, hydrogen sulfides, ammonia, etc., at a defined optimum distance (maximum distance/minimum distance) from the surface that is relevant for the gas concentration measuring device in terms of measurement technology and is relevant for the safety of the aircraft. The gas concentration measuring device advantageously has analyzers as well as sensors or probes.

According to one embodiment, the inspection apparatus has a gas storage device, which operates under a vacuum and which preserves a sucked-in gas sample in a leaktight, in particular airtight or gastight or fluid-tight, manner, in order to supply the gas sample to an evaluation unit, in particular an analysis unit, for later analysis. It is furthermore conceivable that, in addition to the gas storage device, the aircraft also has arranged on it a suction device by means of which, in front of the outer surface being examined, in particular in an air space in front of the outer surface to be examined, any desired emissions or gases are sucked in at a height inaccessible to the specialist personnel in vacuum operation of the coke oven plant and are passed on to the gas storage device. The gas storage device is also, for example, a storage bottle referred to as a "gas sampling bulb" or some other leaktight, in particular fluid-tight container for at least temporarily storing/holding the sucked-in gases/emissions. After the aircraft has landed, the gas storage device is then advantageously decoupled from the aircraft and supplied, for example, to an external gas analysis laboratory for evaluation. For this purpose, the aircraft according to one embodiment has any desired vacuum and/or gas storage unit.

It is likewise conceivable for the inspection apparatus to have a compressed air lance, which serves at least to remove superficial dirt on the surface to be inspected by means of compressed air. This compressed air lance can advantageously also be used in such a way that compressed air is blown into existing cracks, gaps, depressions, etc., of the masonry, of the doors, claddings, etc., in order to determine the depth of these cracks, gaps, depressions, etc., with the aid of a suitable sensor. It is consequently advantageous if the compressed air lance is a physically reactive device. To supply the compressed air lance, the aircraft preferably also has a compressed air reservoir, from which compressed air for the compressed air lance is taken. After removal of the contamination by means of compressed air, the actual depth of unwanted masonry gaps of a coke oven battery can advantageously be determined for the first time, so that a subsequent analysis advantageously serves to find the local position of unwanted gas escapes from the coke oven chamber into the atmosphere or else raw gas crossovers from the coke oven chamber into a heating flue. Similar masonry and structural analyses can thus be carried out at any desired height, including, for example, in the interior of coke quenching towers or coal towers, which, with structural heights of up to 70 m on the inner or outer surfaces, have hitherto been completely inaccessible. Consequently, it is possible for the first time to determine the contamination or state of blockage of the separation lamellae by swirled up coke particles in the upper inner region of a wet quenching tower, for example.

According to one embodiment, the inspection apparatus has a distance measuring device, which, by means of a laser (laser scanner) or ultrasound, detects distances, lengths, distances between solid-body elements, such as components/objects/structures of the plant, close to or on the surfaces which are to be inspected. It is likewise advantageous if the distance measuring device is a physically reactive device. In this case, distances between identical or different solid-body elements (components/objects/structures) on the surfaces which are to be inspected are advantageously measured in a multi-dimensional way. In this context, solid-body elements can be spring elements, a pressure surface, buckstays, riser pipes, wall protection plates, a crosstie or longitudinal tie or tie, rails, rail bearing supports, doors, coke oven closures, a frame, etc. It is likewise conceivable for the inspection apparatus to have a leveling device which detects at least a vertical and/or a horizontal alignment of solid-body elements (components/objects/structures), in particular the abovementioned solid-body elements, close to or on the surfaces which are to be inspected. In this case, it is also advantageously possible to detect unwanted deformations of these solid-body elements which can contribute to the functional impairment of the plant. It is likewise advantageous if the leveling device is a physically reactive device. According to one embodiment, the inspection apparatus has a phototechnical device, such as for example a camera, in particular a high-resolution photographic camera, which at least visually detects damage to the surfaces which are to be inspected. The phototechnical device also serves for the systemic generation/recording of 2-dimensional images of the entire plant or at least regions (components/objects/structures) of this plant, which are subsequently converted into photogrammetric 3-dimensional images in the analysis device. It is conceivable for the phototechnical device to be a digital SLR camera. The phototechnical device also advantageously makes it possible to record the refractory lining of the coke oven chamber of a coke oven battery when, for example, the coke oven door is open. The phototechnical device likewise makes it possible to record images of the plants from a great height, in particular from relatively large distances, even during plant operation, as well as images of components/objects/structures that are difficult to reach by the personnel and that could possibly also endanger the safety of the personnel, such as, for example, regions in the vicinity of the coke oven. In cooperation with the satellite-controlled position detection module of the aircraft, the phototechnical device makes it possible to produce georeferenced images, in particular for a reproducible before/after comparison.

As already described above, the aircraft can operate in defined spatial regions/corridors above or adjacent to the plant, in particular a coke oven battery, and has automatic position detection. Furthermore, it is considered advantageous that the aircraft has a covering which is high-temperature-resistant (heat-resistant), thus enabling the aircraft to pass even through the coke oven chamber of the coke oven battery and penetrate into the interior of the coke oven battery (at least in some section or sections) or enabling it to fly over/inspect other hot regions of the plant. In this case, it is also conceivable for the covering of the aircraft also to be acid-resistant. To protect the inspection apparatus in a harmful environment (high temperatures or harmful fluids or dust), it is conceivable for the inspection apparatus or at least heat-sensitive or acid-sensitive measuring devices of the inspection apparatus to be retractable into the interior of the aircraft via an, advantageously automatically closable, opening (hatch/flap) in the covering. It is likewise conceivable that, for example, the phototechnical device has an at least partially transparent protective casing, which permits the generation of phototechnical images but at the same time permits adequate protection of the phototechnical device against heat and harmful fluids. This protective casing can be arranged on the covering of the aircraft or can be a component of the covering of the aircraft.

According to a second aspect of the disclosure, a method for inspecting equipment in coking plants in order to detect sources of defects using an aforementioned aircraft is claimed, wherein the aircraft acquires data by means of the inspection apparatus and transmits them by means of the transmitting and receiving device to at least one external analysis device for detecting the sources of defects. The method according to the disclosure comprises at least the following steps:

- converting the acquired phototechnical and optical data, in particular 2D data, into a georeferenced 3D thermal point cloud by means of a conversion unit of the analysis device, in particular by photogrammetry, in order to generate at least orthophotos or surface textures or 3D models,
- processing the acquired data from chemically reactive, physically reactive and thermographic devices in a comparison unit of the analysis device in order to determine deviation data,
- combining all the converted data and all the deviation data as well as further operating data in an evaluation unit of the analysis device in order to detect sources of defects by means of image processing algorithms and/or machine learning algorithms. By means of the method according to the disclosure, detection and prediction of sources of defects, such as, for example, deformations in the components/objects/structures of a plant, such as a coking plant, in particular a coke oven battery, are advantageously accomplished, thereby allowing an optimized repair prognosis and, consequently, reducing, in particular minimizing, downtimes of the plant. The aforementioned method advantageously enables automatic and regular monitoring of the components/objects/structures, wherein, if anomalies are detected, the exact position can be output directly and a detailed examination can be initiated, for example with the aid of the aircraft mentioned in the first aspect of the disclosure.

The analysis device is, for example, a computer or server which comprises a plurality of programs for evaluating, comparing and/or analyzing the data sent by the aircraft. For this purpose, the analysis device has a multiplicity of units, in particular self-contained programs, having plant-specific algorithms, which will be described in more detail below. In order to detect sources of defects in a plant, such as a coking plant and, in particular, a coke oven battery of the coking plant, the analysis device can also process data from more than one aircraft, in particular two or more aircraft (a multiplicity of aircraft). It is furthermore conceivable that operating and process data relating to the plant and/or its environment are also made available to the analysis device for the detection of sources of defects or are already stored in a memory unit of the analysis device. For example, the operating and process data are data relating to the operating states of the plant, such as the throughput, the material flow, pressures or gas compositions, or data relating to the temperature sensor system, the filling levels of the ovens and containers or environmental conditions, such as the outside temperature, the humidity, etc. The data acquired by the aircraft and the operating and process data are advantageously made available to the analysis device regularly or continuously.

The data generated by the aircraft according to the disclosure during an overflight of the plant are advantageously processed to give a 3D thermal point cloud, a point cloud thus being calculated from a series of georeferenced and overlapping (aerial) images of the plant by means of a known stitching algorithm. From this calculated point cloud, the spatial position as well as the 3-dimensional shape (3D shape) of the plant or its constituent parts (components/objects/structures) are then determined. This results in distortion-free and true-to-scale images, such as orthophotos, surface textures and/or 3D models.

Image processing algorithms and/or machine learning algorithms are used to evaluate 2D image recordings, 3D point cloud data, thermal data, operating and process data, to be more precise all relevant and acquired data available. This evaluation advantageously comprises the steps described below.

A first step is the recognition and location of (known) components and structures of the plant, the monitoring of which is of interest. These are, for example, filling holes, (coke) oven doors, refractory linings in the region of the open coke oven door, rails, buckstays, riser pipes or the cooling tower, etc. Orthophotos are a preferred data basis for the location of the plant and its sections or components and structures, in particular since the use of orthophotos and their perspective rectification allow precise coordinates and distances to be determined.

According to one embodiment of the method according to the disclosure, the orthophotos or surface textures or 3D model data are pre-processed in such a way that at least noise is suppressed and contrast and brightness are adapted in such a way that, on the one hand, standardization for comparability of different images and, on the other hand, highlighting of distinctive and characteristic components/objects/structures is made possible. Characteristic image features here are, for example, certain color values, edges or else textures.

Subsequently, various image analysis methods are advantageously used to detect objects/structures of interest in the orthophotos and to distinguish them from the background and other irrelevant structures.

Accordingly, at least the Hough transformation or the template matching method or deep learning models based on convolutional neural networks are advantageously used to identify relevant components/objects/structures, in particular depending on their shape, property and frequency. This process is also referred to as point cloud classification. In this case, each point with its coordinate and its color is assigned to an object class, such as, for example, the object class "coal filling hole cover". By applying the Hough transformation, it is possible to identify components/objects/structures, which can be abstracted by simple parameterizable geometric figures, such as lines or circles. These can be, for example, rails or (coal) filling holes, etc. In contrast, components/objects/structures which have non-parameterizable but known and very reproducible shapes, such as, for example, a cooling tower, are advantageously identified by the template matching method, in particular with predefined references. Here, an image section of the searched-for component/object or of the searched-for structure or else a synthetic image which depicts the structure of the searched-for component/object is used as a reference. Deep learning models based on convolutional neural networks (CNN) are advantageously used to identify components/objects/structures with complex or even variable shapes and textures, such as, for example, zones through which gas flows. When training the neuronal network models, a priori knowledge is used, in particular in the form of plant-specific expertise, such as a reference image or a process diagram. Known shapes, microstructures or textures are adapted by transfer learning of the deep learning neural network. By combining the abovementioned applications/methods, it is advantageously possible to automatically identify all common plant and machine components in a targeted manner from image recordings.

According to one embodiment, various features can be extracted from the data relating to the identified relevant components/objects/structures in order to define the components/objects/structures, wherein these features are used at least for regular comparison. In this context, these features relate, for example, to the position, in particular the orientation and height of the components/objects/structures, both in absolute terms and relative to a reference structure. The size and shape, in particular the radius, the center point and/or the edge smoothness are also essential features to be extracted. Further features are, for example, the periodicity and the distances of the components/objects/structures from one another, such as, for example, the distances of the filling holes, etc. This means that if these features are detected continuously or periodically and are superimposed on one another, it is thereby possible to detect and monitor changes in the components/objects/structures, such as, for example, displacements, distortions, deformations, etc.

It is furthermore conceivable that the data relating to the identified relevant components/objects/structures are segmented from the remaining data set region. For example, with regard to the thermal monitoring of the plant, thermal hotspots and local temperature fluctuations are an indication of internal deformation or wear of components, such as, for example, the lining, the masonry, the doors or also of openings. The thermal data obtained are advantageously segmented with the previously detected components/objects/structures, in particular in order to examine the temperature distribution of these components/objects/structures. Subsequently, the following features are, for example, extracted for each component/object or each structure, such as, for example, each (coke) oven: mean, median, min, max, standard deviation and temperature distribution. These features are advantageously additionally aggregated for each structure class, i.e. for example for all (coke) ovens. With this information, all relevant components/objects/structures are advantageously automatically examined for critical or abnormal regions. In this case, critical or abnormal regions can be defined as follows:

- exceeding or falling below predetermined reference values,
- a deviation of a local structure (component/object) from all other structures of the same type,
- a deviation within a local structure (component/object) due to local hotspots or changes in the local temperature distribution and/or
- a deviation of a structure (component/object) or a structure class from historical values and distributions.

In the context of the disclosure, historical values (data) are understood to mean values or data which have already been determined and processed at some previous time on the same structure (component/object) and are advantageously stored, at least in the short term, in the analysis device, in particular in the memory unit of the analysis device.

As already mentioned above, at least the data from thermographic devices are superimposed with the data relating to the identified relevant components/objects/structures in such a way that a temperature distribution becomes visible and thermal deviation data are determined.

However, it is also conceivable, as an alternative or in addition, that at least the data from chemically reactive and physically reactive devices are superimposed with the data relating to the identified relevant components/objects/structures, such that chemical deviation data and physical deviation data are determined.

The aforementioned data recording and the analysis steps are advantageously carried out regularly, particularly advantageously in a predetermined interval cycle. From this, the change with respect to time of the local components/objects/structures, such as the already mentioned distances, sizes, positions, etc., and their temperature properties can advantageously be documented and visualized over time.

As already indicated, at least the data relating to the identified relevant components/objects/structures and the data from chemically reactive, physically reactive and thermographic devices and the deviation data and the operating data which have been acquired and evaluated are stored as historical data (values) in a memory unit of the analysis device, wherein a model, in particular a correlation model, is trained with the aid of the historical data, and can be used to predict sources of defects. To be more precise, it is possible with the aid of the trained model to predict changes, such as deformations, displacements and temperature hotspots. In addition, it is conceivable that a correlation model is trained by combining the determined data from current data recordings with the historical data, in particular the historical operating and process data of the plant itself, which correlation model represents the relationship between the mode of operation of the plant and the structural as well as thermal or chemical changes of important components/objects/structures. This advantageously results in a prediction/forecast of the changes in the plant on the basis of the past data (historical data) with integration of the data/information from the thermographic, chemical reactive or physically reactive (measuring) devices. From the prediction/forecast of the changes in the plant, it is advantageously possible to plan necessary maintenance in an optimally timed manner before critical damage to the plant arises. Moreover, there is also helpful and important information, such as the exact position and the degree of change (displacement), available for the maintenance team and the maintenance work to be carried out. The correlation model mentioned also advantageously enables data-based predictive operation of the plant, in which operating modes of the plant which have a positive effect can be recommended in order to avoid the occurrence of sources of defects, such as thermal hotspots or displacements, etc., as far as possible or at least to postpone them in time in such a way that the plant can be operated for as long as possible without maintenance.

With the method described, all the advantages that have already been described with respect to an aircraft according to the first aspect of the disclosure are obtained.

The use of an aircraft according to the first aspect of the disclosure in combination with a method according to the second aspect of the disclosure for inspecting equipment in coking plants, in particular for inspecting coke oven batteries, to detect sources of defects, is also claimed (as a third aspect of the disclosure).

It is self-evident that the features mentioned above and those that will be explained below can be used not only in the respectively specified combination but also in other combinations or on their own without departing from the scope of the present disclosure.

Elements with the same function and mode of operation are each provided with the same reference signs in FIGS. 1 to 8.

FIG. 1 shows schematically in a side view one embodiment of a coke oven 101 of a coking plant as well as embodiments of the aircraft 1, 2, 3 according to the disclosure during the inspection of equipment of the coke oven 101 of a coking plant 100. The coke oven 101 has a multiplicity of twin heating flues 102, which extend in the vertical direction within the coke oven 101. The coke oven 101 has an approximate height of 20 m. The operators 50 or the specialist personnel 50, who are responsible for the firing of the coke oven 101, can consequently inspect only limited areas of the coke oven 101, even using appropriate coke oven operating platforms 105. In particular, the (lateral) coke oven roof 111 is not accessible to the operators 50 or can be examined only with difficulty and with an increased safety risk. The aircraft 1, 2, 3, in particular a multiplicity of aircraft 1, 2, 3, in particular three aircraft 1, 2, 3, which advantageously have differently designed inspection apparatuses, provide a remedy in this case. However, all the aircraft 1, 2, 3 have the same basic structure required to enable flight and control. Thus, the aircraft 1, 2, 3 each have a propeller 20 with a corresponding electric motor, as well as a rechargeable battery/a battery 21 for supplying the electric motor and advantageously the inspection apparatus 10 with electrical energy, a flight controller 22, sensors 23 for flight monitoring and a satellite-controlled position detection module 24. A transmitting and receiving device 25 is advantageously also integrated in each aircraft 1, 2, 3, at least for transmitting the acquired data, and particularly advantageously also a storage device 26, at least for brief temporary storage of the acquired data. The first aircraft 1 has an inspection apparatus 10 comprising a temperature measuring device 12, a distance measuring device 13 and a gas concentration measuring device 11 (also referred to as an emission measuring device). Correspondingly, the second aircraft 2 has an inspection apparatus 10 likewise comprising a temperature measuring device 12, a gas concentration measuring device 11 (also referred to as an emission measuring device) and a distance measuring device 13. The third aircraft 3, on the other hand, has an inspection apparatus 10 which is constructed differently to this and which comprises a temperature measuring device 12, a gas concentration measuring device 11 (also referred to as an emission measuring device) and a gas storage device 17 as well as a suction device 18. Accordingly, the inspection apparatuses 10 can be individually adapted in respect of their measuring devices or measuring attachments and the aircraft 1, 2, 3 can consequently be individually equipped. This means that the measuring attachments can be exchanged at any time. The number of measuring attachments or measuring devices is limited only by the dimensions of the aircraft 1, 2, 3 itself.

As can be seen in FIG. 1, the first aircraft 1 serves primarily to carry out an inspection of the coke oven roof 111, in particular of the coke oven surface 111 (also referred to as a coke oven masonry surface) of the coke oven 101. For this purpose, the first aircraft 1 flies the entire length of the coke oven roof 111, which can be substantially between 10 and 30 m, as well as the entire width thereof. Based on the configuration of the inspection apparatus 10, it is possible to examine the coke oven roof 111 with regard to thermal, emission-related and/or distance- or spacing-relevant sources of defects. A coke oven surface monitoring operation advantageously takes place, in which the heating duct cover 107, the coal filling hole cover 106, the raw gas riser pipe cover 108, the raw gas riser pipe 109, the raw gas riser pipe hub 110, the masonry regions located between these elements and ultimately the entire coke oven surface 111 are inspected and examined for the presence of sources of defects. In particular, a thermal image of the coke oven surface 111 is generated with the aid of the temperature measuring device 12, wherein the temperatures of the specific objects/structures of the coke oven surface 111, such as, for example, the coal filling hole cover 106, are also tested with respect to their temperature level. Typical temperatures of the coal filling hole covers 106, in particular their frames, are approximately 100-350° C. A permissible deviation from the setpoint value is approx. +10K. The typical temperatures at the heating duct covers 106 (which are also referred to as sight hole covers) are approximately 50-300° C. A permissible deviation from the setpoint value is approx. +10K. The typical temperature of the raw gas riser pipe 109, in particular its advantageously metallic protective jacket, is approximately 50-300° C., with a permissible deviation from the setpoint value being approximately +10K. With the aid of the gas concentration measuring device/emission measuring device 11, it is possible to detect unintentionally emerging gases (emissions) near the surface of the coke oven 101. For this purpose, relevant objects/structures, in particular their surroundings (atmosphere in the immediate vicinity of the relevant object), in which an unwanted escape of corresponding gases can occur, are examined, for example. Such objects/structures are, for example, the raw gas riser pipe cover 108 or the coal filling hole cover 106 or else the raw gas riser pipe hub 110. With the aid of the distance measuring device 13, it is possible to determine spacings between relevant objects/structures or else components of the coke oven 101, such as, for example, distances between two coal filling hole covers 106 (ΔL2) or between a coal filling hole cover 106 and a wall of the coke oven 101 (ΔL1). These measured distances (data/values) are then stored in a memory device 26 of the aircraft 1 and sent by means of the transmitting and receiving device 25 to an external analysis device 40. In this analysis device 40, these data are stored as historical data in a corresponding storage unit (not shown here) and are compared with incoming current data in a comparison unit (not shown here). It is thereby possible to determine changes in the distances, which in turn indicate unwanted deformations/displacements of the objects/structures of the coke oven 101.

According to FIG. 1, the second aircraft 2 also has a distance measuring device 13 with which, for example, the length (and/or width) or, in addition, the deflection of the coke oven door 103 is measured. In particular, the lateral spacing monitoring can be carried out with the aid of the distance measuring device 13 at heights inaccessible to the operators 50, wherein, for example, the following spacings/distances are determined: the spacings between the force adjusting elements (springs) on the coke oven door 103, the force adjusting elements (springs) of the transverse anchoring springs of the buckstay, gaps between the coke oven door sealing strip and the coke oven chamber frame support surface and/or gaps between the leveler door sealing strips and the coke oven chamber frame support surface. Furthermore, the second aircraft 2 advantageously also comprises a compressed air lance 15, which, with the aid of compressed air, can, on the one hand, remove dirt on the surfaces of the coke oven 101 or the objects/structures thereof and, on the other hand, is also useful for determining the crack depths thereof by blowing the compressed air into cracks/depressions in the masonry of the coke oven 101 or its objects/structures. The second aircraft 2 consequently also advantageously has a compressed air reservoir 27, which serves, for example, to make available compressed air for the compressed air lance 15.

In the meantime, the third aircraft 3 depicted in FIG. 1 carries out lateral emission monitoring in a space (air space L) which is inaccessible to the operators 50. To be more precise, the gas concentration measuring device 11 is used to examine a space (atmospheric space/atmospheric air space L) which is formed outside the coke oven 101 in the immediate vicinity of an object of the coke oven 101, in particular in the immediate vicinity of a surface of the object. This object can be, for example, a leveler door 104 or a coke oven door 103, through which gases (emissions) can escape (even when the door is closed). In this context, the following gases/emissions are determined, for example: hydrogen sulfide, benzo[a]pyrenes, nitrogen oxides, carbon monoxide and dust. It is conceivable for the aircraft 1, 2, 3 to communicate with one another and thus exchange determined data/values directly or indirectly via the analysis device 40, for example in order to commission one another or to be commissioned by the analysis device 40 to carry out further/supplementary examinations or inspections on certain objects/structures of the plant 100. This is necessary, in particular, if all of the aircraft 1, 2, 3 in use have inspection apparatuses 10 which are equipped differently from one another and, during an examination, one of the aircraft 1, 2, 3 has detected a deviation from the setpoint value which needs to be verified or even supplemented by measurements of another aircraft 1, 2, 3, or in order to determine what the cause (source of defect) of this deviation is. Consequently, if the third aircraft 3 detects an increased and unwanted leakage of a gas by means of the gas concentration measurement, one of the other aircraft 1, 2 can be requested, e.g. by a measurement by means of the leveling device 16 or the distance measuring device 13, to determine displacements at the doors of the coke oven 101, which may be the cause of the leakage of the gases. Furthermore, the third aircraft 3 also has a gas storage device 17 for at least temporary storage or fluid tight holding of gases/emissions. Accordingly, it is conceivable that, in addition to or alternatively to the direct measurement of emissions by means of the gas concentration measuring device 11, the gases escaping from the plant 100 are sucked out of the atmospheric air space L, for example by means of the suction device 18, and fed to the gas storage device 17. The suction device 18 can be a component of the inspection apparatus 10 and consequently, like the other measuring devices or also the gas storage device 17, can be mounted exchangeably on the aircraft 3. It is also conceivable for the suction device 18 to be directly (immediately) operatively connected to the gas storage device 17 and consequently to be arranged on or at least next to the gas storage device 17 on the aircraft 3. Alternatively, it is also conceivable for the suction device 18 to be operatively connected indirectly (via an intermediary) to the gas storage device 17 and consequently to be arranged at any desired position on the aircraft 3 and to be connected to the gas storage device 17 via lines (hoses).

It is conceivable for each of the aircraft 1, 2, 3 to comprise a phototechnical device 14 for generating images, in particular 2-dimensional images.

Figure 2:
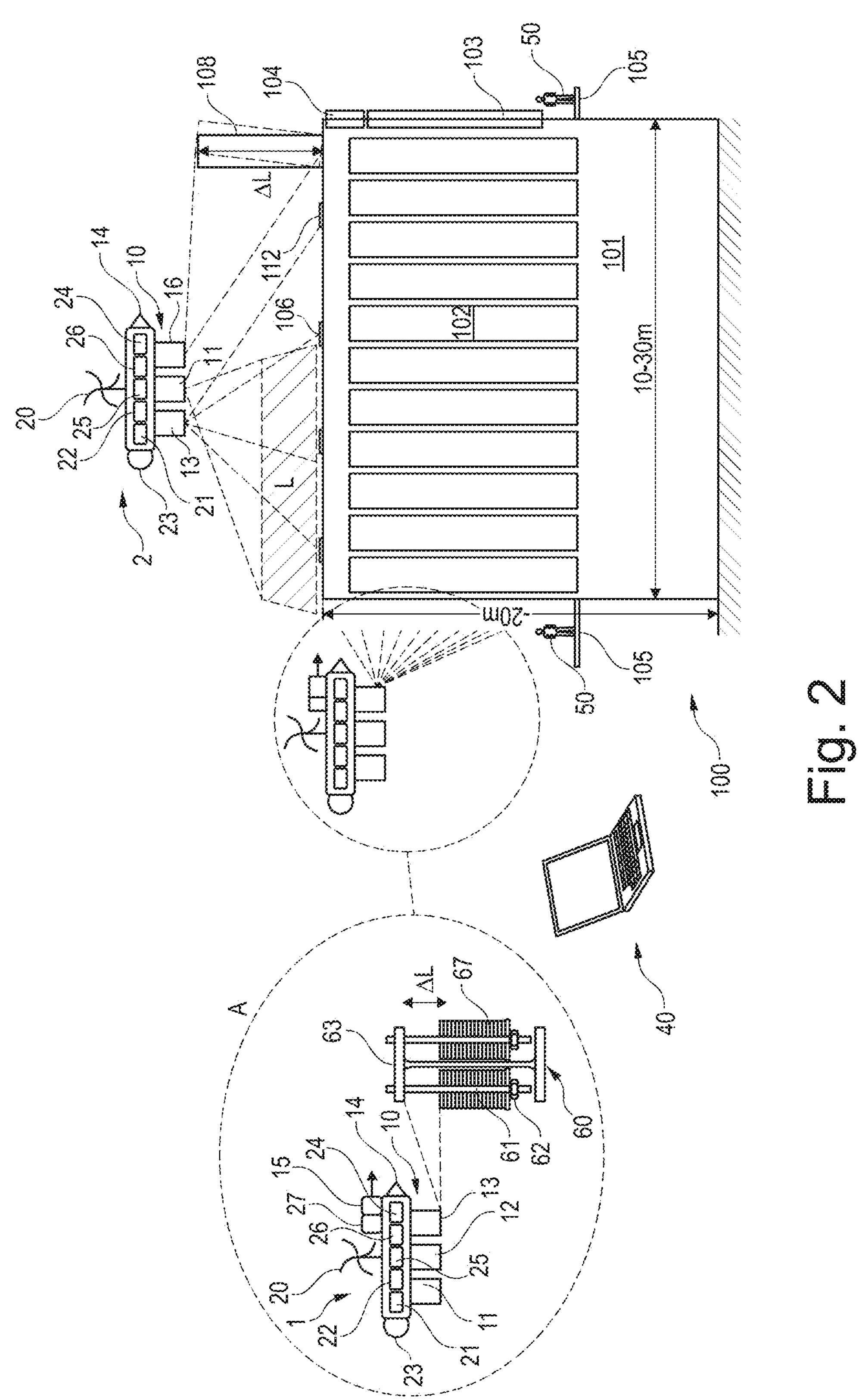
FIG. 2 shows a side view of a coke oven of a coking plant and another embodiment of the aircraft according to the disclosure during the inspection of equipment of the coke oven.

FIG. 2 shows a side view of an embodiment of a coke oven 101 of a coke plant 100, in particular the coke oven 101 shown in FIG. 1, as well as further embodiments of the aircraft 1, 2 according to the disclosure during the inspection of devices (objects/structures) of the coke oven 101. The first aircraft 1 has an inspection apparatus 100 having a temperature measuring device 12, a gas concentration measuring device 11, a compressed air lance 15 and a distance measuring device 13. With the aid of the distance measuring device 13, lateral spacing monitoring of the coke oven 101 at heights inaccessible to the operators 50 is possible. Accordingly, force adjusting elements (springs) of the transverse anchoring springs 67 are advantageously inspected for the horizontal preloading of the buckstay 60. The buckstay 60 of the transverse anchorage has a maximum of ten vertically arranged spring packs 61 above the lateral coke oven operating platforms 105 and thus above a regenerator, as can also be seen in detail A of FIG. 2. In this case, it is necessary with the aid of the aircraft 1, 2, in particular as shown in FIG. 2, to check the spacing between the spring assembly 61 of the transverse anchorage and the base plate 63 (ΔL) at regular maintenance intervals with the aid of the first aircraft 1, and consequently up to 14 springs per coke oven side, up to 28 springs per coke oven 101 and up to 2550 springs per coke oven battery have to be checked regularly by the aircraft 1. The degree of force transmitted is advantageously determined by determining the value ΔL.

The second aircraft 2 shown in FIG. 2 has an inspection apparatus 10, which comprises a gas concentration measuring device 11, a distance measuring device 13 and a leveling device 16. The second aircraft 2 is advantageously used for monitoring the coke oven surface 111, in particular the coke oven roof 111. With the aid of the distance measuring device 13, the spacings between the individual coal filling hole covers 106 are measured when the plant 100 is in bulk mode or between the individual gas extraction opening covers 112 when the plant 100 is in stamping mode. The determined values/data are then transferred to the analysis device 40. Using the leveling device 16, the second aircraft 2 can check, in particular, the longitudinal alignment of the raw gas riser pipe 108 or of the coke oven door 103 or of a buckstay (not shown here) or of the coke oven chamber frame 114 in order to determine any deviations in the form of slopes of the raw gas riser pipe 108 or of the coke oven door 103 or of the buckstay or of the coke oven chamber frame 114. Furthermore, the gas concentration measuring device 11, which can also be referred to as an emission measuring device, is used to detect escaping gases in the region of the coke oven surface 111, in particular in the atmospheric air space L thereof, in particular above the openings (coal filling hole cover 106 or gas extraction opening cover 112) of the coke oven 101.

It is conceivable for each of the aircraft 1, 2 to have a phototechnical device 14 for generating images, in particular 2-dimensional images, a propeller 20 with a corresponding electric motor, as well as a rechargeable battery/battery 21 for supplying the electric motor and advantageously the inspection apparatus 10 with electrical energy, a flight controller 22, sensors 23 for flight monitoring and a satellite-controlled position detection module 24. A transmitting and receiving device 25 is advantageously also integrated in each aircraft 1, 2, at least for transmitting the acquired data, and particularly advantageously also a storage device 26, at least for brief temporary storage of the acquired data.

With regard to the embodiments of the aircraft according to the disclosure, as indicated in FIGS. 1 and 2, it is observed that it is possible to use more or fewer than the illustrated measuring devices per aircraft 1, 2, 3. The selection of the type and number of measuring devices is substantially dependent on the plant to be examined and on the number of aircraft 1, 2, 3 used.

Figure 3:
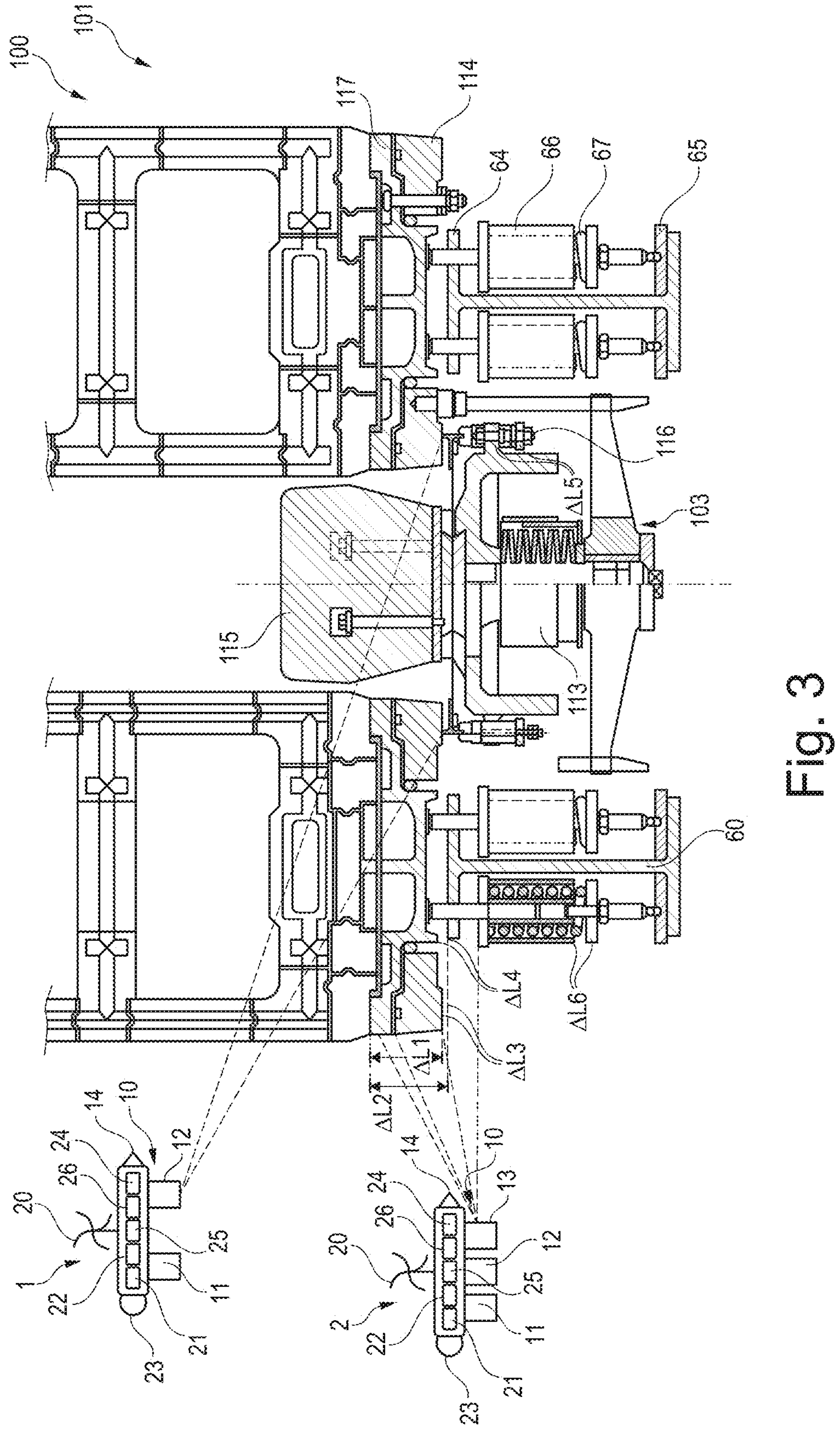
FIG. 3 shows a side view of equipment of the coke oven and an inspection by means of the aircraft according to the disclosure.

FIG. 3 shows in a side view embodiments of equipment (objects/structures) of the coke oven 101 and their inspection by means of an embodiment of the aircraft 1, 2 according to the disclosure. According to FIG. 3, two aircraft 1, 2 are used to monitor the depicted objects/structures. With the exception of the inspection apparatus 10, these aircraft 1, 2 are constructed essentially in the same way as the aircraft 1, 2, 3 described in FIGS. 1 and 2, and therefore reference is made here in full to the description thereof. The first aircraft 1 has an inspection apparatus 10 which comprises a gas concentration measuring device 11 and a temperature measuring device 12. Consequently, this first aircraft 1 is used to determine unwanted emissions at the objects/structures of the plant 100 and the release of heat by the individual objects/structures. The second aircraft 2 has an inspection apparatus 10 which, in addition to a gas concentration measuring device 11 and a temperature measuring device 12, also comprises a distance measuring device 13. With the aid of this distance measuring device 13 in particular, it is possible to enable monitoring of lateral spacing at a height which is inaccessible to the operators (not shown here). In particular, the force adjustment elements (springs) of the transverse anchoring springs 67 are checked or measured for the horizontal preloading of the buckstay 60. In this case, vertical deformations and/or thermally induced bending of the wall protection plate 117, of the coke oven door 103, of the buckstay 60 or of the coke oven chamber frame 114 are checked at various heights. Accordingly, it is possible, for example, to determine spacings between the wall protection plate 117 and the lower end of the coke oven chamber frame 114 (ΔL1) and/or between the wall protection plate 117 and the buckstay inner flange 64 (ΔL2) and/or between the lower end of the coke oven chamber frame 114 and the buckstay inner flange 64 (ΔL3) and/or between the wall protection plate 117 and the buckstay inner flange 64 (ΔL4) and/or between the coke oven door spring contact pressure element 116 and the coke oven door frame 113 (ΔL5) and/or between the distal end of the transverse anchoring spring 67 and the transverse anchoring spring sleeve 66 (ΔL6). These details are only illustrative in order to show that with the aid of the aircraft 1, 2, in particular the distance measuring device 13 thereof, a multiplicity of spacings of a very wide variety of objects, such as, for example, the outer flange 65 of the buckstay, the coke oven door insulation block 115 and many more, can be determined.

Figure 4:
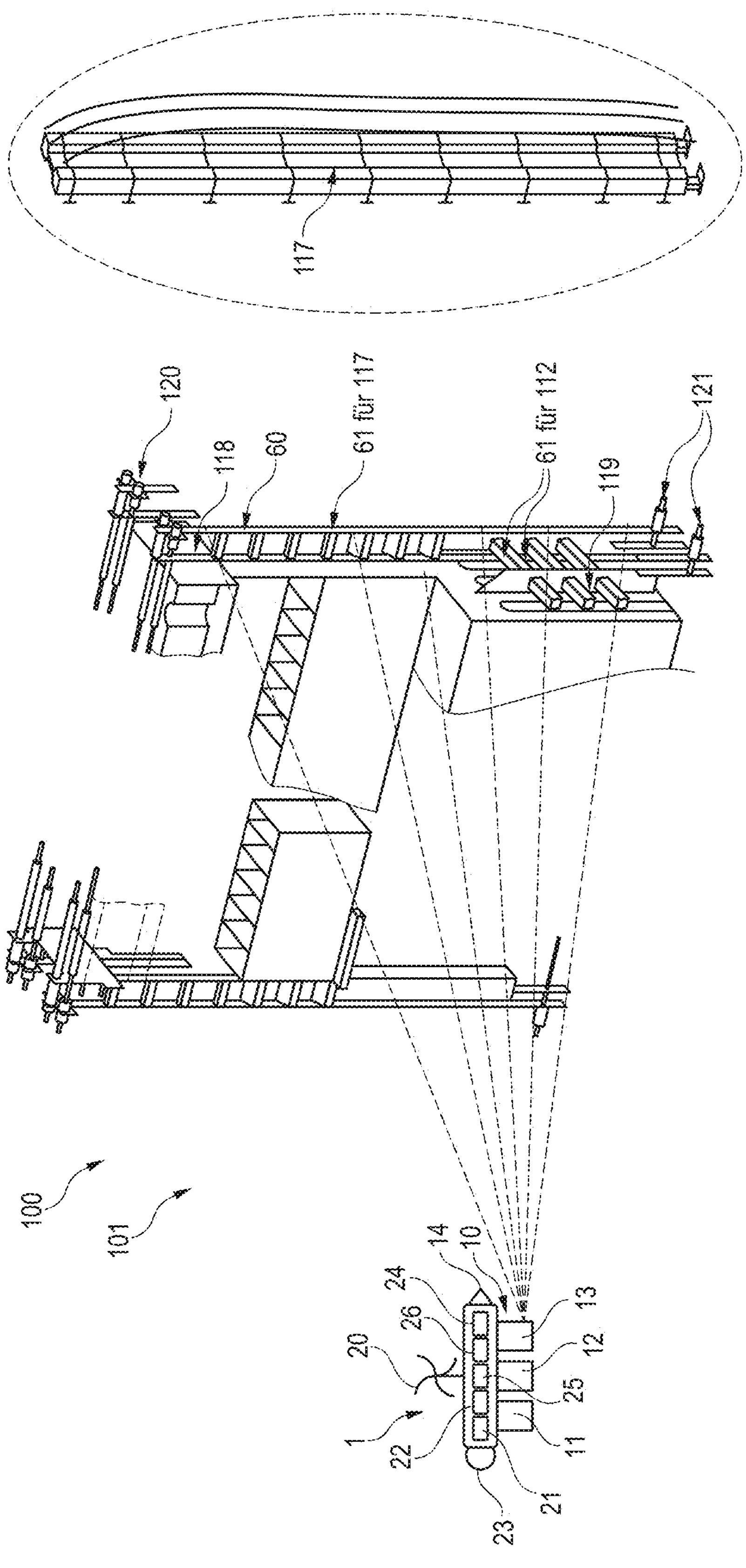
FIG. 4 shows a perspective view of a transverse anchoring system of a coke oven and its inspection by means of an embodiment of the aircraft according to the disclosure.

FIG. 4 shows in a perspective view a transverse anchoring system of a coke oven 101 and its inspection by means of an embodiment of the aircraft 1 according to the disclosure. In this case, the aircraft 1 is used, for example, for lateral spacing monitoring at heights inaccessible to the operators of the plant 100. As already described with reference to FIGS. 1 to 3, the aircraft 1 shown in FIG. 4 likewise has at least one propeller 20 with a corresponding electric motor, as well as a rechargeable battery/a battery 21 for supplying the electric motor and advantageously the inspection apparatus 10 with electrical energy, a flight controller 22, sensors 23 for flight monitoring, a satellite-controlled position detection module 24, a transmitting and receiving device 25 at least for transmitting the acquired data, and advantageously also a storage device 26 at least for brief temporary storage of the acquired data. Furthermore, it is particularly advantageously possible for the aircraft 1 to have a phototechnical device 14, such as a camera, with the aid of which at least 2-dimensional images of the plant 100 and/or objects/structures/components of the plant 100 can be recorded. Furthermore, the aircraft 1 comprises an inspection apparatus 10 which has a gas concentration measuring device 11, a temperature measuring device 12 and a distance measuring device 13. With the aid of these measuring devices, in particular the distance measuring device 13, it is possible to check vertical deformations, in particular thermally induced bending of objects and structures, such as the buckstay 60. Here, the distance measuring device 13 detects/measures different distances between the coke oven roof anchor 118, the spring elements or the spring pack 61 for fixing the wall protection plate 117, the spring elements or the spring pack 61 for fixing the regenerator cover plates, the regenerator anchor 119, the upper transverse anchor 120 and/or the lower transverse anchor 121, in order to name a few examples, although these are not to be regarded as exhaustive. Detail B shows a wall protection plate 117, the thermally induced deformation of which is then detected with the aid of the aircraft 1, in particular the inspection apparatus 10 of the aircraft 1.

Figure 5:
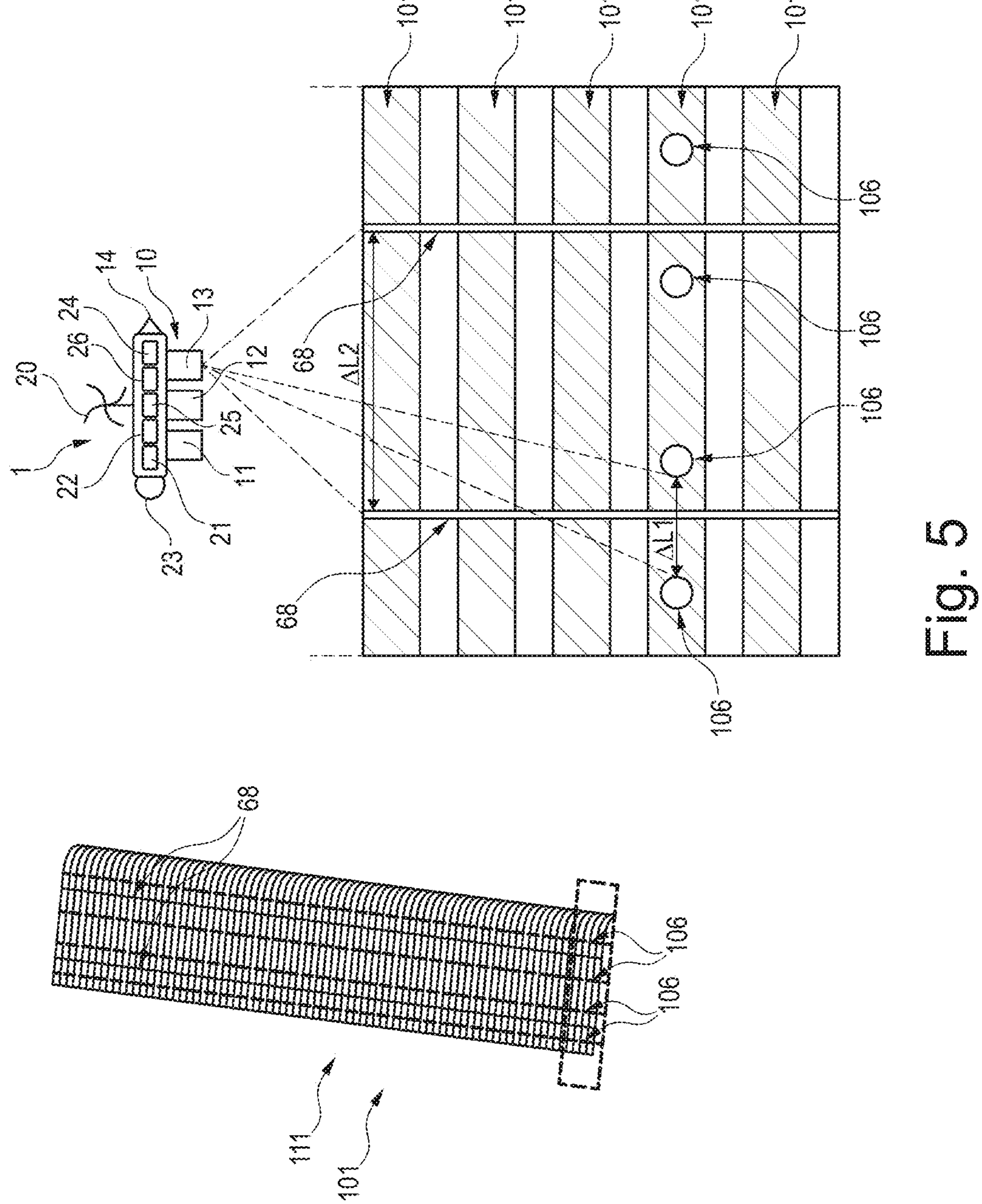
FIG. 5 shows an inspection of spacings on a coke oven roof of the coke oven by embodiments of the aircraft according to the disclosure.

FIG. 5 shows the inspection of spacings on a coke oven roof 111 of the coke oven 101 by embodiments of the aircraft 1 according to the disclosure. The coke oven roof 111 is subject to thermal expansion displacements, which must be detected. The aircraft 1 has substantially the same structure as the aircraft 1 mentioned in FIG. 4, and therefore the descriptions presented for this FIG. 4 can also be referred to in full for the aircraft 1 in FIG. 5. On the coke oven surface 111 there is a multiplicity of coal filling hole covers 106, which have a metal frame. Approximately 4 to 5 coal filling hole covers 106 are advantageously formed per coke oven 101 of the coke oven battery. With the aid of the distance measuring device 13, the aircraft 1 can measure the distances between the frames of the individual coal filling hole covers 106, i.e. ΔL1, and/or the spacings between the longitudinal ties 68, i.e. ΔL2. The aircraft 1 then sends these determined data/values by means of the transmitting and receiving device 25 to a corresponding analysis device 40 (not shown here), which compares the received data/values with already stored historical data/values from previous distance measurements of the coke oven roof 111 in order to determine deviations. Alternatively, it is conceivable that, for example, with the aid of the distance measuring device 13, a laser measurement, a radar measurement and/or photogrammetry, in particular an optical measurement, of the coke oven surface 111, in particular of the coal filling hole cover 106 and its frame, is carried out. The determined/measured two-dimensional or three-dimensional data/values are then provided (transmitted) in the form of a point cloud of the analysis device 40, which generates therefrom a digital, precisely georeferenced representation of the plant. After the transmission or creation of the 3D representation by the analysis device 40, distance measurements can be carried out manually in a further step by the operator or else automatically with the aid of a corresponding calculation program of the analysis device 40.

Figure 6:
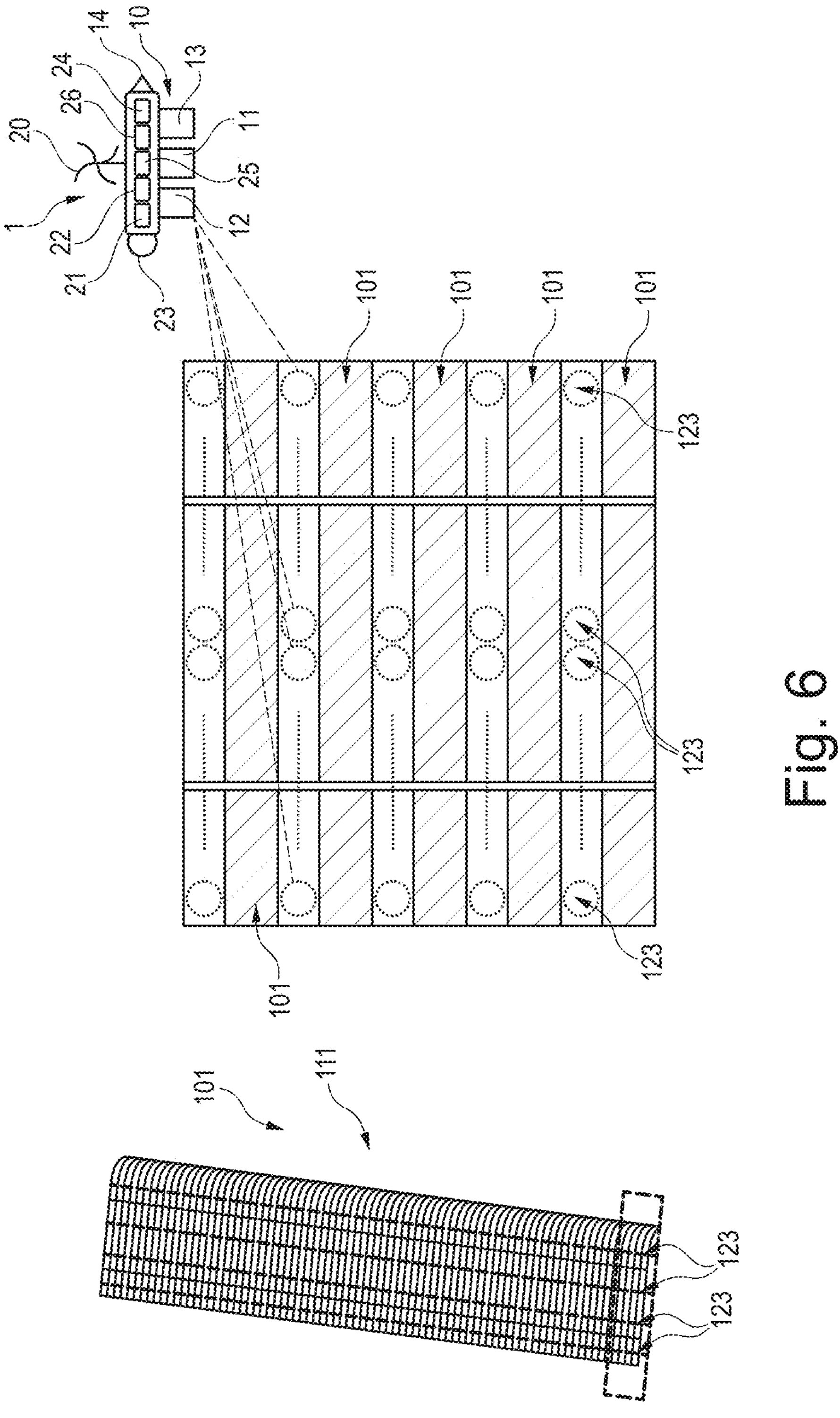
FIG. 6 shows an inspection of heating flue closures on a coke oven roof of the coke oven by an embodiment of the aircraft according to the disclosure.

FIG. 6—which is comparable to FIG. 5—shows the inspection of heating flue closures 123 on a coke oven roof 111 of the coke oven 101 by embodiments of the aircraft 1 according to the disclosure. The aircraft 1 has substantially the same structure as the aircraft 1 mentioned in FIG. 4, and therefore the descriptions presented for the aircraft in FIG. 4 can also be referred to in full for the aircraft 1 in FIG. 6. With the aid of the temperature measuring device 12 of the inspection apparatus 10, a temperature measurement is carried out on the coke oven roof 111, in particular on the heating flue closures 123. This advantageously enables technical conclusions relating to the heating to be derived, in particular since uniformity of the temperatures—especially in the bulk mode of the operated coke oven battery—is desired. In the thermal monitoring of the coke oven roof 111, in particular of the coke oven surface 111, a temperature measurement advantageously takes place on the at least twenty to at most forty-four heating flue closures 123 of a heating wall. For the sake of clarity, FIG. 6 shows four heating flue closures 123, namely the first heating flue closure 123, the nineteenth heating flue closure 123, the twentieth heating flue closure 123 and the forty-fourth heating flue closure 123. The points shown in between symbolize the remaining heating flue closures 123, which are not shown in detail here. Advantageously, during the thermal monitoring of the heating flue closures 123, cracks in the masonry are also detected, e.g. by a noticeable temperature coloration during operation of an infrared camera as a temperature measuring device 13.

Figure 7:
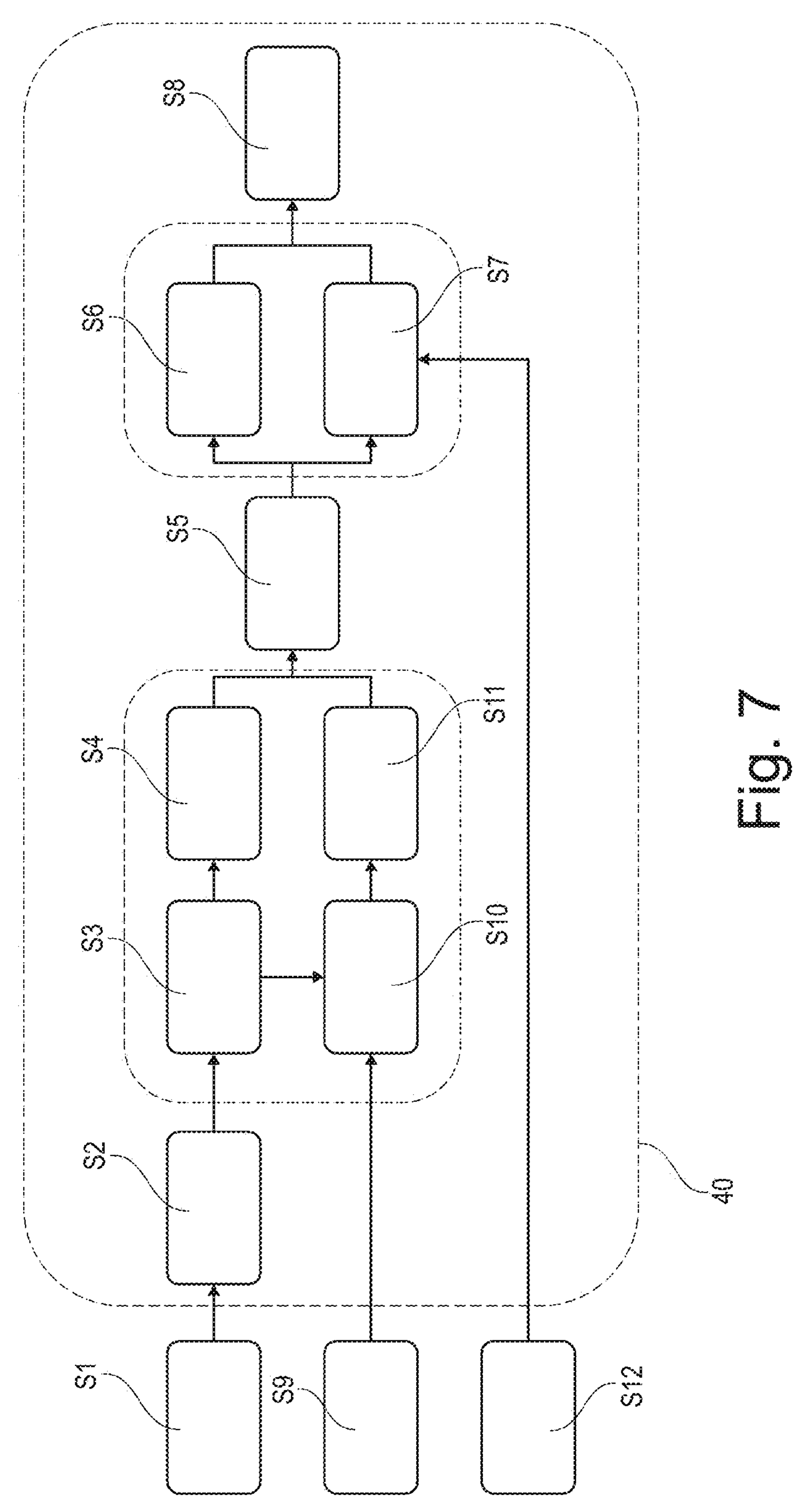
FIG. 7 shows a flow diagram relating to one embodiment of an inspection method according to the disclosure.

FIG. 7 shows a flow diagram relating to one embodiment of the method of inspection according to the disclosure. In step S1, data/values are collected from the plant to be inspected, in particular the objects and structures thereof, by means of the inspection apparatus of the aircraft, in particular by means of the phototechnical device, such as the camera, sent to an analysis device 40, and converted into orthophotos in a subsequent step S2 by means of the analysis device 40. These orthophotos serve to identify the plant with its individual components/objects/structures in a subsequent step S3 and to locate individual (relevant) components/objects/structures. In step S4, these data are then processed further in an appropriate manner in order to be able to determine more precisely individual features with regard to the position, orientation, size, etc., of the individual objects/structures. Advantageously, further data/values are simultaneously collected by the inspection apparatus in step S9, in particular by the gas concentration measuring device, the distance measuring device, the compressed air lance and/or the leveling device, and are forwarded (transferred) to the analysis device 40. From these data/values, corresponding features in respect of the temperature of the objects/structures, the distances, spacings, lengths and/or deflection, etc. are then determined in step S10, and compared in a subsequent step S11 with specified setpoints or historical (older) data/values in order to determine anomalies/changes over time. This is then carried out, in particular, in a subsequent step S5, in which the data/values relating to the plant to be examined, that is to say its 3-dimensional shape with all relevant objects/structures, are superimposed with data/values which have been determined in step S11 and which deviate from the specified setpoints. In a step S12, operating data/process data from the plant to be monitored are made available to the analysis device 40 and correlated with the data/values from step S5 in a step S7. At the same time, in step S6, a first all-encompassing forecast with regard to the changes in the plant to be monitored takes place. These data from step S6 and step D7 are then combined in a step S8, making it possible to draw up a predictive maintenance program for the plant.

Figure 8:
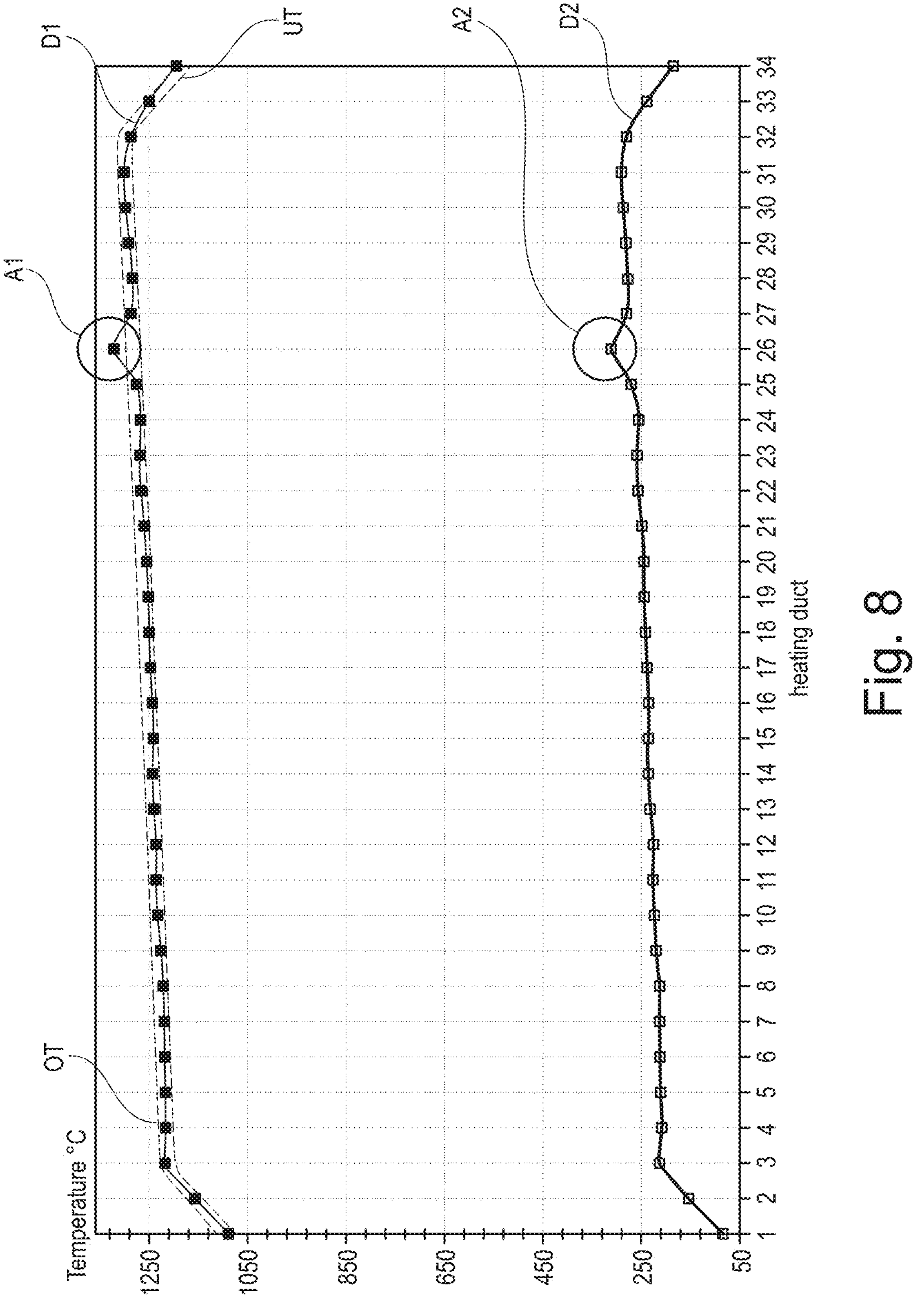
FIG. 8 shows a line diagram illustrating manually measured temperatures at the bottom of the individual heating ducts and to visualize deviations/outliers in comparison with temperature measurements by one embodiment of the aircraft according to the disclosure on the covers of the coke oven.

FIG. 8 shows a (first) line diagram D1 intended to represent manually measured temperatures at the bottom of individual heating ducts and to visualize deviations/outliers in comparison with a (second) line diagram D2 intended to represent temperature measurements, carried out by one embodiment of the aircraft according to the disclosure, on the covers of the coke oven, such as the coal filling hole covers and/or the heating duct covers. Here, manual measurement of the temperature is carried out by an operator who measures a guide temperature at the bottom of the heating duct, in particular of the heating flue, through the viewing hole covers, for example by means of a pyrometer. The measured temperature is then transmitted to the analysis device, which correspondingly plots it via a line diagram.

The dashed line shows the permissible tolerance limits, to be more precise the upper temperature tolerance limit OT and the lower temperature tolerance limit UT. The measured temperature should be within these temperature tolerance limits (OT and UT), which are approximately +−15K relative to the averaged actual measured value. The coke oven measured here has a coke oven battery with thirty-four heating ducts arranged between the coke side and the machine side. It can be seen from the first line diagram D1 that the temperature measured in duct number twenty-six (26) exceeds the upper temperature tolerance limit OT and consequently deviates by more than 15K from the illustrative actual value tolerance+−15K and consequently forms a deviation/an outlier A1. It is also conceivable for the typical tolerance limits to be between 5-30K relative to the measured actual value. According to the second line diagram D2, the temperature per heating duct is plotted, wherein a temperature measurement is carried out by means of one embodiment of the aircraft according to the disclosure, as described above. In this case, as can be seen, for example, in FIG. 1, the aircraft (here, in particular, the first aircraft 1) measures the temperature of the coke oven roof 111, in particular at its openings or covers, such as the coal filling hole cover 106 and/or the heating duct cover 107 and/or the frame thereof, by means of a corresponding temperature measuring device 12. The measurement data acquired by the aircraft 1 are then likewise sent to an analysis device 40, for example via WLAN or Bluetooth. The analysis device 40, in particular an evaluation unit and/or comparison unit of the analysis device 40, then compares the data obtained with the data relating to the upper temperature tolerance limit OT and the lower temperature tolerance limit UT in order to detect deviations/outliers, such as in particular the outlier represented by the reference symbol A2, from the setpoint values/data and to report these, for example, to the specialist personnel (operator). Visualization of the data, as shown in FIG. 8 by the line diagrams D1, D2, can be carried out by means of a corresponding graphic unit, such as a monitor/screen, thus enabling the results of the measurements, in particular of the temperature measurements, to be made clear visually for the specialist personnel at a location which is safe in terms of emissions. As a consequence, an instruction is, for example, given to the specialist personnel to examine the heating cross section of the heating duct at which a deviation of the measured actual value from the predetermined setpoint value has occurred, in particular to readjust the corresponding heating cross section or the media volume flows.

LIST OF REFERENCE SIGNS

1 (first) aircraft
2 (second) aircraft
3 (third) aircraft
10 inspection apparatus
11 gas concentration measuring device/emission measuring device
12 temperature measuring device
13 distance measuring device
14 phototechnical device/camera
15 compressed air lance
16 leveling device
17 gas storage device
18 suction device
20 propeller
21 rechargeable battery/battery
22 flight controller
23 sensors
24 satellite-controlled position detection module
25 transmitting and receiving device
26 storage device
27 compressed air reservoir
40 analysis device
50 operator/specialist personnel
60 buckstay
61 spring pack
62 nut
63 base plate
64 buckstay inner flange
65 buckstay outer flange
66 transverse anchoring spring sleeve
67 transverse anchoring spring
68 longitudinal tie
100 plant/coking plant
101 coke oven
102 twin heating flue/heating duct
103 coke oven door
104 leveler door
105 coke oven operating platform
106 coal filling hole cover
107 heating duct cover
108 raw gas riser pipe cover
109 raw gas riser pipe
110 raw gas riser pipe hub
111 coke oven roof/coke oven surface/coke oven masonry surface
112 gas extraction opening cover
113 coke oven door frame
114 coke oven chamber frame
115 coke oven door inner insulation block
116 coke oven door spring contact pressure element
117 wall protection plate
118 coke oven roof anchorage
119 regenerator anchorage
120 upper crosstie
121 lower crosstie
122 regenerator cover plate
123 heating flue closure
A detail of the buckstay
A1 deviation/outlier in D1
A1 deviation/outlier in D2
B detail of the wall protection plate
D1 (first) linear diagram
D2 (second) linear diagram
L atmospheric air space
OT upper temperature tolerance limit
UT lower temperature tolerance limit
ΔL1—distance
ΔL6 spacings/distances

What is claimed is:

1. An aircraft for inspecting equipment in coking plants in order to detect sources of defects, comprising:

a heat-resistant housing;

at least one propeller with an electric motor for enabling the aircraft to fly;

at least one rechargeable battery for providing electrical energy;

a flight controller for controlling the electric motor;

sensors at least for determining flight altitude or angular velocity or obstacles on a flight path; and a satellite-controlled position detection module for determining the position of the aircraft;

wherein the aircraft includes at least one inspection apparatus for inspecting surfaces of equipment and for inspecting an air space L spaced apart from the surfaces, and at least one transmitting and receiving device for data communication with at least one other aircraft or with at least one external analysis device for detecting sources of defects;

wherein the inspection apparatus or components thereof are configured to be retracted into an interior of the aircraft through an automatically closable opening, including a hatch/flap, in the housing;

wherein the inspection apparatus includes:

a temperature measuring device configured to contactlessly determine a temperature field on a surface to be inspected;

a gas concentration measuring device configured to detect gas concentrations in the air space (L) spaced apart from the surfaces;

a gas storage device, configured to operate under a vacuum and preserve a gas sample in a leaktight manner;

a compressed air lance configured at least to remove superficial debris on the surface to be inspected;

a distance measuring device, which, by using a laser or ultrasound, is configured to detect distances, lengths, distances between solid-body elements, objects/structures, close to or on the surfaces which are to be inspected;

a leveling device configured to detect at least a vertical and/or a horizontal alignment of solid-body elements, including objects/structures close to or on the surfaces which are to be inspected; and a phototechnical device configured to at least visually detect damage to the surfaces which are to be inspected.

2. The aircraft of claim 1, wherein the heat-resistant housing is acid-resistant.

3. The aircraft of claim 1, wherein the phototechnical device includes a partially transparent protective cover which allows the generation of phototechnical recordings and protects the phototechnical device against heat and harmful fluids.

4. A method for inspecting equipment in coking plants in order to detect sources of defects using an aircraft, wherein the aircraft includes a heat-resistant housing and acquires data by an inspection apparatus and transmits them by a transmitting and receiving device to at least one external analysis device for detecting the sources of defects, wherein the inspection apparatus or components thereof are configured to be retracted into an interior of the aircraft through an automatically closable opening, including a hatch/flap, in the housing, wherein the inspection apparatus includes a gas-concentration measuring device as a chemically reactive device which measures gas concentrations in an atmospheric airspace outside the coke oven in the immediate vicinity of an object of the coke oven, an infrared temperature-measuring device which determines a temperature field on a surface to be inspected in a contactless manner, and a phototechnical device which visually detects damage on the surfaces to be inspected, wherein the method comprises:

converting acquired phototechnical and optical 2 D data recorded by the phototechnical device into a georeferenced 3D thermal point cloud using a conversion unit of the analysis device and photogrammetry, in order to generate at least orthophotos or surface textures or 3D models;

processing acquired data from the gas-concentration measuring device, the infrared temperature measuring device, and the phototechnical device in a comparison unit of the analysis device in order to determine deviation data; and combining all the converted data and all the deviation data as well as further operating data in an evaluation unit of the analysis device in order to detect sources of defects by image processing algorithms and/or machine learning algorithms;

wherein the orthophotos are pre-processed in such a way that at least noise is suppressed and contrast and brightness are adjusted so that, on the one hand, normalization for comparability of different images and, on the other hand, highlighting of characteristic and relevant components/objects/structures is enabled;

wherein for the identification of relevant components/objects/structures at least the Hough transformation or the template-matching method or deep-learning models based on convolutional neural networks are used;

wherein from the data relating to the identified relevant components/objects/structures various features are extracted for the definition of the components/objects, which serve at least for regular comparison;

wherein data relating to the identified relevant components/objects/structures are segmented from the remaining data-set area;

wherein at least the data from the temperature-measuring device, are superimposed with the data relating to the identified relevant components/objects so that a temperature distribution becomes visible and thermal deviation data are determined;

wherein data from chemically reactive and physically reactive devices are superimposed with data relating to the identified relevant components/objects/structures so that chemical deviation data and physical deviation data are determined;

wherein at least the data relating to the identified relevant components/objects/structures as well as the data from chemically reactive, physically reactive, and temperature-measuring device and the deviation data as well as the operating data which were recorded and evaluated are stored as historical data in a memory unit of the analysis device;

wherein with the aid of the historical data a correlation model is trained with which sources of defects are predicted.

5. The method of claim 4, wherein the aircraft is used for inspecting equipment in coking plants to detect sources of defects.

* * * * *